Figure 1:
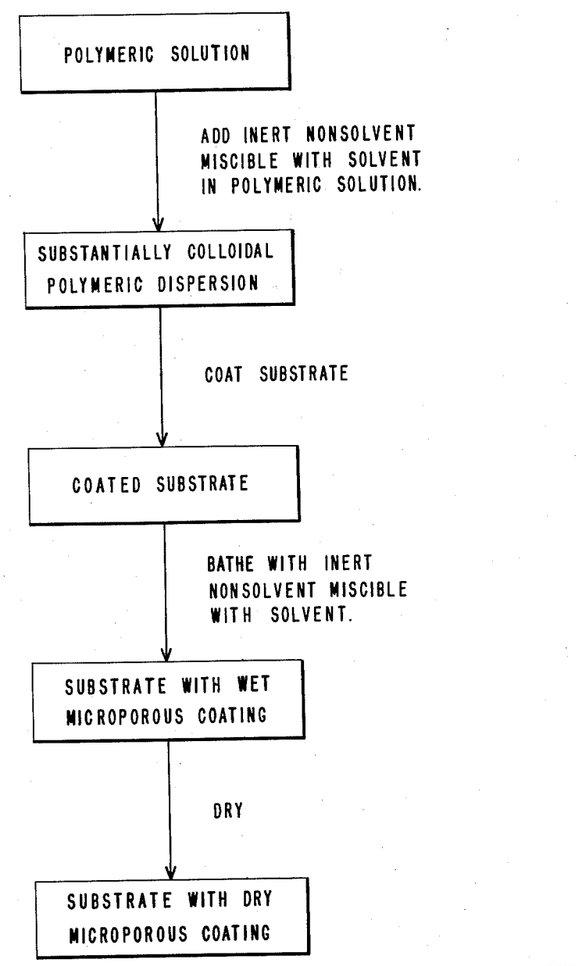

United States Patent Office 3,100,721
Patented Aug. 13, 1963

3,100,721
PROCESS FOR PRODUCING MICROPOROUS FILMS AND COATINGS
Ellsworth Kissam Holden, Newburgh, N.Y., assignor to E. I. du Pont de Nemours and Company, Wilmington, Del., a corporation of Delaware
Filed Feb. 21, 1961, Ser. No. 90,815
9 Claims. (Cl. 117—135.5)

This invention relates to a process for preparing porous articles and more particularly to a process for preparing films and coatings of uniform or improved microporosity. One preferred embodiment of this invention relates to a process for preparing unplasticized microporous leather substitutes which are strong, supple and abrasion resistant.

Vapor permeable polymeric films and coatings have become increasingly important in recent years. One important application for such permeable films and coatings is in leather substitutes. Other applications are, for example, in clothing, ink pads and rollers and as bearing materials. Heretofore, such products have been prepared by applying polymeric coatings to porous substrates then piercing the coatings in a conventional needle loom. This procedure has the disadvantage of leaving visible holes in the coating which make the porous articles unsuitable for many purposes; for example, in leather substitutes, visible pores detract from the leather-like appearance of the product. Other permeable products have been made from impregnated unwoven fibrous batts; by preferential extraction of one component of a polymeric sheet or film or by blowing pores in a polymeric sheet with a blowing agent. Each of these procedures have one or more disadvantages; for example, they are complicated and time consuming or yield products which have visible pores or poor uniformity, tensile strength and tactile properties.

Prior attempts to make microporous coatings by depositing polymers from solvents have also had several disadvantages. First, it has heretofore been very difficult to form films and coatings of uniform or controlled porosity. Porous films or coatings obtained by known processes tend to have, in addition to fine pores, substantially larger, even macroporous, pores which may extend practically to the surface of the films or coatings. For some purposes, products with such non-uniformity have the obvious disadvantage that once the surface is worn visible pores appear. Also, products with exposed macropores are more difficult or impossible to polish and, thus, are unsuitable for some end uses. Furthermore, known processes for forming microporous coatings are normally only useful for producing thin coatings and are very time consuming as well.

Other known processes for making microporous films and coatings, for example, those employing latices, have similarly fallen short of desired goals; for example, they have been somewhat limited in the polymers, particularly elastomers, which can be employed, limited in the thickness of products which can be made, limited in substrates to which such films and coatings can be applied and undesirable in time consumed and difficulty of control.

I have discovered a process for making microporous films and coatings which eliminates the disadvantages of prior processes and yields products which are of uniform or greatly improved microporosity. Furthermore, as one preferred embodiment of this invention, I have discovered a process for making unplasticized leather substitutes which have excellent tactile and tensile properties. The process of this invention can be employed with a wide spectrum of polymers to yield products of improved microporous character. Some types of polymers used in the process of this invention to yield microporous films and coatings cannot be used in other known processes. Also, the process of this invention is applicable to a wide variety of substrates and thicknesses of products. For example, by the subject process, very fluid, easily coatable compositions can be applied to porous substrates without undesirable absorption of compositions by the substrate or distortion of the substrate. In summary, the subject invention provides a rapid, efficient and widely applicable process for making products of improved microporosity.

The first step in the process of this invention is to form a solution having as essential constituents a polymeric component and solvent for the polymeric component. Next, an inert liquid which is a nonsolvent for the polymeric component and is miscible with the solvent is added to the aforementioned polymeric solution until about the point at which a substantially colloidal polymeric dispersion is formed. The substantially colloidal polymeric dispersion has a vicosity of greater than about 1 poise and a polymer concentration of greater than about 7% by weight. Finally, the substantially colloidal dispersion is coated onto a substrate and bathed with an inert liquid which is a nonsolvent for the polymeric component and is miscible with the solvent, then the resulting product is dried. The aforementioned polymeric component, which can include, for example, plasticizer, dyes and pigments in addition to polymer, has a maximum elastic deformation strength of at least about 100 pounds per square inch from the time it is bathed until it is dried.

The accompanying drawing is a schematic representation of an embodiment of this invention.

Any of a wide variety of polymers can be used in the process of this invention, the primary requirement being that the polymeric component in any product of this invention has a maximum elastic deformation strength of at least about 100, and preferably about from 130 to 300 pounds per square inch from the time the product has been bathed with nonsolvent until it is dried. Not only does the maximum elastic deformation strength, hereinafter specified as "$T_0$," generically specify the polymers used in the process of this invention, but, in addition, it relates all the components used therein. Thus, for example, the $T_0$ of a proposed polymeric component is first measured to ensure that it falls above the above limit. Next, any nonsolvent is chosen which does not lower the $T_0$ below 100 pounds per square inch at the temperature of the bathed products during drying. A solvent for the polymer to be used which is miscible with the nonsolvent completes the essential process materials.

$T_0$ is determined by measuring and plotting the stress-strain curve of a substantially void-free, for example, solution cast, film of the polymeric component and drawing a straight line tangent and coincident with the initial straight portion of the stress-strain curve representing elastic deformation. $T_0$ is the stress at the point at which the aforementioned straight line departs from the stress-strain curve. The stress-strain data is preferably determined on an Instron tensile tester, Model TTB, at a speed of 100% elongation per minute using a one-half inch wide rectangular sample, usually about 10 to 20 mils thick, and one inch between grips. The temperature of the microporous coatings during bathing or drying, whichever is higher, is used as the test temperature. In order to reflect the effect of nonsolvent during drying on the bathed product wet therewith, $T_0$ is measured on a void-free sample saturated and in equilibrium with nonsolvent. In essence, the polymeric component and nonsolvent are coupled so that after the coating has been bathed and while it is removed from the bath and dried, the polymeric component in the coating has a $T_0$ above the aforementioned limit.

In general, with polymers having a $T_0$ approaching the lower limits above it may be desirable to take special precautions discussed more fully hereinafter to prevent reduction of $T_0$ by other process variables such as the drying temperature, the nonsolvent, and residual solvent. Polymeric components initially having a $T_0$ somewhat below the aforementioned limit can be employed in the process of this invention, provided, however, that by the time the products thereof have been bathed and are ready to be dried, the $T_0$ thereof has been raised, for example, by curing in the bath, to above the aforementioned limit. For example, the rubbery carboxylic modified copolymers of butadiene-1,3-hydrocarbons and acrylic nitriles can be cured with zinc oxide and sulfur or similar curing agents together with conventional accelerators in a nonsolvent bath used to remove solvent therefrom or, for example, in a similar subsequent bath, for example, at temperatures of from room temperature up to about 100° C.

The wide spectrum of polymers which can be employed in the subject case range, for example, from vinyl addition polymers and polyurethanes to condensation polymers such as polyamides, polyesteramides and polyesters. Vinyl chloride polymers, that is, homopolymers of vinyl chloride and conventional copolymers thereof with, for example, minor amounts (usually 15% by weight or less) of vinyl acetate, acrylonitrile, vinylidene chloride, vinylidene fluoride or maleic, fumaric or acrylic acid esters are particularly preferred groups of vinyl polymers useful in this invention. These vinyl chloride polymers are inexpensive, abrasion resistant, compatible with a wide variety of other polymers used in this invention and readily formed into microporous coatings by the processes of this invention. Polyvinyl butyral, poly(alphamethyl styrene), polyvinylidene chloride and polymers of methyl methacrylate including homopolymers of methyl methacrylate or copolymers thereof with minor amounts, for example, up to 25% by weight, of acrylic acid, methacrylic acid, 1- to 4-carbon atom alkyl (i.e., methyl to butyl) esters of acrylic acid, the 2 to 4 carbon alkyl (i.e., ethyl, propyl and butyl) esters of methacrylic acid, vinyl acetate, acrylonitrile and styrene are examples of other vinyl polymers which can be used. Still other vinyl polymers include, for example, copolymers of acrylonitrile with, preferably minor portions, that is, 50% by weight or less, of esters of alpha-olefinic monocarboxylic acids with saturated aliphatic monohydric alcohols of 1- to 8-carbon atoms. Examples of such esters are methyl, propyl, isobutyl, hexyl, 2-ethyl butyl, cyclohexyl and octyl acrylate, methacrylate, ethacrylate, phenylacrylate or crotonate. If desired, small amounts, for example, a few percent, of free alpha-olefinic monocarboxylic acid such as those just indicated can be used in the aforementioned copolymers. Still other vinyl polymers are, for example, copolymers similar to those just mentioned but containing styrene instead of acrylonitrile; chlorosulfonated polyethylene and copolymers of butadiene and acrylonitrile containing, for example, 25% or more of acrylonitrile. Of course, mixtures of the aforementioned vinyl polymers, for example, mixtures of polychloroprene and 25% or more of vinyl chloride polymers, also can be employed.

The vinyl polymers can be plasticized with conventional plasticizers such as, for example, di(2-ethyl hexyl) phthalate, di(2-ethyl hexyl) azelate, di(butoxyethyl) phthalate, dioctyl sebacate, benzyl butyl phthalate, 2-ethyl hexyl phthalate, dicyclohexyl phthalate and mixtures thereof. Of course, the amount of plasticizer should not reduce $T_0$ below the aforementioned limit. With vinyl chloride polymers, up to about 50% or even more of plasticizer, based on the weight of polymer, often can be tolerated.

Still other polymers which can be employed in this invention include, for example, polyesters such as the condensation products of alkylene glycols such as ethylene glycol, propylene glycol or tetramethylene glycol with an acid component comprising a major proportion, for example, at least 50% by weight of arylene dicarboxylic acid and, if desired, minor proportions of an acyclic dicarboxylic acid such as adipic acid, suberic acid, azeleic acid, sebacic acid, 2,5-diethyl adipic acid 2-ethyl suberic acid or mixtures thereof; polyamides such as copolymers of caprolactam, hexamethylene diamine, adipic acid and sebacic acid, poly(N-methoxymethyl hexamethylene adipamides), copolymers of terephthaloyl chloride and isophthaloyl chloride or phthalic anhydride with arylene diamines; and cellulose esters such as cellulose acetate butyrate, nitrocellulose, cellulose acetate propionate and mixtures thereof.

Polyurethanes either alone or in admixture with other polymers, particularly vinyl chloride polymers, form a particularly important class of polymers used in the subject invention. One class of polyurethanes of particular interest are polyureas, that is, polyurethanes containing the recurring structural unit These polyureas can be prepared by chain extending a prepolymer, that is, a polyurethane prepolymer, with a compound having two active hydrogen atoms bonded to amino nitrogen atoms. The prepolymers are prepared, for example, by mixing one or more polyalkyleneether glycols or hydroxyl-terminated polyesters with a molar excess of organic diisocyanate and heating the mixture of a temperature of about from 50 to 100° C. to form a prepolymer having terminal —NCO groups. An alternate procedure is to react the diisocyanate with a molar excess of polyalkyleneether glycol or polyester, then cap the resulting product, that is, react it with more diisocyanate to form a prepolymer having terminal —NCO groups.

Polyalkyleneether glycols used in the prepolymers usually have a molecular weight of about 300 to 5000 and preferably 400 to 2000 and include, for example, polyethylene-ether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example, the compound wherein $n$ is an integer greater than 1 can also be used.

Polyesters which can be used instead of or in conjunction with the polyalkyleneether glycols are, for example, those formed by reacting acids, esters or acid halides with glycols. Suitable glycols are polymethylene glycols such as ethylene, propylene, tetramethylene, decamethylene glycols, substituted polymethylene glycols such as 2,2-dimethyl-1,3-propanediol and cyclic glycols such as cyclohexanediol. These glycols are reacted with aliphatic, cycloaliphatic or aromatic dicarboxylic acids or lower alkyl esters or ester forming derivatives thereof to produce relatively low molecular weight polymers, preferably having a melting point of less than about 70° C. and molecular weights on the order of those of the aforementioned polyalkyleneether glycols, and preferably about 400 to 2000. Acids for preparing such polyesters are, for example, succinic, adipic, suberic, sebacic, terephthalic and hexahydroterephthalic acids and the alkyl and halogen substituted derivatives of these acids.

Aromatic, aliphatic and cycloaliphatic diisocyanates or mixtures thereof can be used in forming the prepolymers. Such diisocyanates are, for example, tolylene-2,4-diisocyanate, tolylene-2,6-diisocyanate, m-phenylene diisocyanate, biphenylene 4,4'-diisocyanate, methylene bis(4-phenyl isocyanate), 4-chloro-1,3-phenylene dissocyanate, naphthalene-1,5-diisocyanate, tetramethylene-1,4-diisocyanate, hexamethylene-1,6-diisocyanate, decamethylene-1,10-diisocyanate, cyclohexylene-1,4-diisocyanate, methylene bis(4-cyclohexyl isocyanate) and tetrahydronaphthylene diisocyanate. Arylene diisocyanates, that is, isocyanates in which the isocyanate groups are attached to an aromatic ring are preferred. In general they react more readily than do alkylene diisocyanates.

The prepolymer of the polyalkyleneether glycol, polyester or a mixture thereof and diisocyanate is next chain extended with a compound having two active hydrogen atoms bonded to amino-nitrogen atoms thereby joining several prepolymer molecules together to form a substantially linear polymer. One or more chain-extending compounds can be added directly to the prepolymer. Alternatively, segmented polymers can be formed by reacting a prepolymer having terminal —NCO groups with a chain-extending agent plus more diisocyanate. The prepolymer thus formed consists of large prepolymer segments linked together with chain-extending agent and smaller segments consisting of the reaction product of chain-extending agent and the excess diisocyanate.

Another alternative method of chain extending is to divide the prepolymer into two portions, then partially react each portion with different chain-extending agents. Finally, the two resulting portions are combined and the chain extension is completed with more chain-extending agent.

The prepolymer for the preferred polyurethanes is chain-extended with at least one compound having two, and only two, functional groups, bearing active hydrogen atoms bonded to amino-nitrogen atoms, for example, one of the group consisting of hydrazine, substituted hydrazines and diamines including both primary and secondary diamines. Examples of such chain extending compounds are hydrazine, mono-substituted hydrazines, dimethyl piperazine, 4-methyl m-phenylene diamine, m-phenylene diamine, 4,4′-diamino diphenyl methane, 1,4-diamino piperazine, ethylene diamine or mixtures thereof. Hydrazine is the preferred chain-extending agent.

The chain-extension reactions are usually carried out at a temperature below 120° C. and often, particularly for hydrazine extended polymers, at about room temperature. The chain-extension reaction can be carried out without solvent in heavy duty mixing equipment or they can be carried out in homogeneous solutions. When the reaction is carried out in solutions, for convenience, one of the organic solvents employed in forming the microporous coatings can be used as a solvent. The chain-extension process just described usually yields a substantially linear polymer having a molecular weight of about from 5000 to 300,000.

A wide variety of polyurethanes chain extended with hydrazine and useful in this invention, including hydrazine-extended polyurethanes described in detail above are disclosed and claimed in U.S. Patent No. 2,957,852. Other polyurethanes which can be used in the subject invention are elastomers prepared by reacting one mole of polyester having a molecular weight of about 600 to 1200 with about 1.1 to 3.1 moles of a diphenyl diisocyanate in the presence of about 0.1 to 2.1 moles of a glycol containing about from 4 to 10 carbon atoms. The polyesters, usually similar to those described hereinbefore, are hydroxyl-terminated condensation products of 4- to 10 carbon atom acyclic dicarboxylic acid with a molar excess of 4- to 10-carbon atom alkylene glycol. Polyurethanes of this type are described in U.S. Patent No. 2,871,218. Other polyurethanes include reaction products of a mixture of about one mole of polyalkyleneether glycol similar to those described hereinbefore, about from 0.5 to 9.0 moles of a 4- to 12-carbon atom aliphatic glycol and about from 1.5 to 10 moles of a diphenyl diisocyanate such as those polyurethanes described in U.S. Patent No. 2,899,411.

The preferred polyurethanes are the chain-extended polyurea-type described in detail hereinbefore. The preferred polyurethanes are formed from aliphatic polyol segments of about from 400 to 2000 molecular weight including the polyalkyleneether glycols having $C_3$ to $C_{12}$ alkylene segments and the hydroxyl-terminated polyesters of $C_3$ to $C_{12}$ acyclic dicarboxylic acids and $C_3$ to $C_{12}$ alkylene glycols. The preferred polyurethanes are prepared with at least a major portion of reactive arylene diisocyanate such as those mentioned hereinbefore, particularly, for example, tolylene-2,4-diisocyanate, tolylene-2,6-diisocyanate and methylene bis(4-phenyl isocyanate). Hydrazine is particularly preferred as the chain-extending agent for the preferred polyurethanes, although $C_1$ to $C_6$ aliphatic (including cycloaliphatic) diamines such as ethylene diamine, hexamethylene diamine and dimethyl piperazine and 1,4-diamino piperazine can also be used advantageously, either alone or, for example, in admixture with hydrazine.

As will be evident to those skilled in the art, adjustments in the constituents used in preparing the aforementioned polyurethanes can be made in order to insure polymers within limits of $T_0$ set forth hereinbefore. Thus, for example, polyurethanes having a higher $T_0$ can be prepared by increasing the amount of arylene diisocyanate in the polyurethane, decreasing the molecular weight of the polyol, that is, hydroxyl-terminated polyester or polyalkyleneether glycol, segments therein or introducing a small portion of an aromatic component into the polyol. In addition, or alternately, as will be described more fully hereinafter, blends of polymers such as blends of vinyl chloride polymers and polyurethanes, can be employed to adjust the $T_0$ of the polymeric composition used in the process of this invention.

Although it is within the scope of this invention to prepare microporous coatings using at least one vinyl polymer, or for that matter, any one or more of the aforementioned classes of polymers, as the sole polymeric material, the aforementioned polyurethanes, and especially the preferred polyureas, and mixtures thereof containing vinyl polymer are preferred. Such mixtures, preferably of vinyl chloride polymer, can contain, for example, from 1 to 2% of vinyl chloride polymer to 75% or more thereof. Preferably, however, such mixtures contain at least about 50% by weight of the aforementioned polyurethanes, and preferably about from 50 to 75% by weight thereof. Since strong, supple, leather-like coatings can be made from polyurethanes without plasticizers, the polyurethanes have a distinct advantage over vinyl polymers which must be plasticized to be flexible. Plasticizers are undesirable in some applications, for example, in leather substitutes, because with time the plasticizers migrate out of films and coatings leaving products which are stiff and brittle. Mixtures of vinyl polymer, particularly vinyl chloride polymer, and at least about 50%, and preferably 50 or 75% by weight of polyurethanes such as those described hereinbefore are particularly preferred because microporous films and coatings made from such mixtures by the process of this invention do not have to be plasticized and have outstanding strength, flexibility and abrasion resistance. In short, such products have a wearing comfort, durability and tactile properties comparable to natural leather. In addition, and surprisingly, optimum micropore character and control thereof is obtained with such mixtures.

The particular solvent which is used to form the polymeric solutions depends largely upon the particular polymeric component and the non-solvent which are used. The solvent should be substantially inert toward the other materials employed in the process of this invention, although, for example, the solvent can form hydrates with the nonsolvent as in the case of N,N-dimethyl formamide and water. The solvent should be miscible, preferably completely miscible, with the nonsolvent and extractable from the microporous films and coatings. The polymeric solutions of the solvents should show a sharp, that is, readily ascertainable end point when nonsolvents are added thereto to form substantially colloidal dispersions. In the case of polyurethanes, including the preferred polyureas, if the prepolymer is chain extended in solution, then applied directly, the solvent should not hinder the chain-extension reaction.

Solvents which can be used in the process of this invention include, for example, amides such as formamide and hexamethyl phosphoramide; esters such as ethyl acetate and butyl acetate; ethers such as dioxane, butyl Carbitol, diethylene glycol dimethyl ether; alcohols such as methanol, ethanol and isopropanol; ketones such as acetone and methyl isobutyl ketone; sulfones such as tetramethylene sulfone and dimethyl sulfone; hydrocarbons such as toluene, xylene and benzene; phenols such as phenol, o-cresol, o-chlorophenol and o- and m-nitrophenol; and miscellaneous other solvents such as malonitrile, sulfolane, chloroform and aqueous formic acid solutions. Other specific examples of solvents useful in this invention are, for example, N,N-dimethyl formamide, dimethyl sulfoxide, tetrahydrofuran, tetramethyl urea, N,N-dimethyl acetamide and mixtures thereof such as, for example, equal weight mixtures of dimethyl sulfoxide and tetrahydrofuran. N,N-dimethyl formamide and mixtures thereof are particularly preferred because they meet the requirements above with a wide variety of polymer. Of course, any one particular solvent will not necessarily work with all of the aforementioned polymers; for example, methanol may act as a solvent for certain polyamides and a nonsolvent for certain polyurethanes; the crux is that for any particular system selected, the solvent should fulfill the criteria mentioned hereinbefore, primarily of solvency, miscibility and inertness. The concentration of polymeric solutions is not critical as long as the subsequently formed dispersions have a viscosity and concentration falling within limits hereinafter specified.

With blends of polyurethanes and vinyl chloride polymers, in some cases in order to obtain improved microporosity color and a broader end-point range, amino compounds having at least one active hydrogen atom bonded to an amino nitrogen atom, particularly hydrazine, can be reacted with the polymeric solutions before nonsolvent is added thereto and the resulting compositions further processed in accordance with this invention. The amino compound is added slowly to a vigorously agitated polymer solution, usually in the amount of 5 to 30%, and preferably 10 to 20% based on the weight of polyurethane. A reaction period of at least about 3 minutes but in some cases permissively up to 1 to 6 hours or more, and preferably on the order of 3 to 4 minutes is employed. The reaction temperature is usually about room temperature.

An inert liquid which is a nonsolvent for the polymeric component and is miscible with the solvent is next added to the polymeric solution described above until a substantially colloidal polymeric dispersion is formed. The crux in the selection of nonsolvent lies in their effect on $T_0$, their miscibility and their inertness in the system in question. Suitable inert liquids include, for example, glycol monoethyl ether, water, polyols such as ethylene glycol, glycerol, 1,1,1-trimethylol propane and mixtures thereof. Other nonsolvents include methanol, ethanol, acetone, hydrocarbons such as hexane, octane, benzene, petroleum naptha and toluene and chlorinated hydrocarbons such as tetrachloroethylene and chloroform.

The amount of inert liquid nonsolvent which must be added to the polymeric solution depends upon the solvent, the polymeric component and its concentration, the nonsolvent and the temperature at which the nonsolvent is added. Among other things, for example, generally substantially more glycerol than water is added to a given polyurethane solution. For polymeric dispersions having a concentration of about 10 to 25% and consisting of N,N-dimethyl formamide and a polymeric mixture consisting of polyvinyl chloride and at least 50% by weight of polyurea, about from 5 to 2% by weight, respectively, of water based on the total weight of dispersion is usually used.

The nonsolvent is added with vigorous agitation to the polymeric solution until a substantially colloidal dispersion is formed. As used herein "substantially colloidal dispersion" means a hazy or opalescent dispersion of finely divided polymer. The minimum amount of nonsolvent which is added is that amount which causes the polymeric component to start to separate as colloidal particles from solution. The maximum amount of nonsolvent is that amount which causes the solution to separate into separate phases or causes a substantial portion of the polymeric component to separate as a gel. In practice, a point of about half-way between these limits is desired. To find the desired end point, nonsolvent can be added slowly with vigorous, thorough mixing to a sample of polymeric solution until the first persistent haze or opalescence appears therein, then the amount of nonsolvent added is recorded. Addition of nonsolvent is then continued until the polymeric composition settles into a separate gross phase or layer when agitation is stopped, for example, for 5 minutes and the amount of nonsolvent again is recorded. Addition of nonsolvent in an amount of about half-way between those recorded yields dispersions in the general area of the optimum end point. The optimum end point for any particular application may vary slightly from the aforementioned half-way point; thus, several samples prepared with substantially colloidal dispersions containing amounts of nonsolvent varying slightly from that used for the aforementioned half-way point are normally examined microscopically to determine the precise amount of nonsolvent needed to obtain the pore structure desired. Once the desired end point is determined as described above, products can be made from the same polymeric solution and nonsolvent either by using the same amount of nonsolvent each time or, for example, by measuring the light transmittance of the aforementioned sample with the desired end point and using the same transmittance in making successive products with the same polymeric solution.

It should not be concluded from the preceding discussion that the substantially colloidal polymeric dispersions obtained during the process of this invention generally are obtained over a broad range of concentrations of nonsolvent. As indicated hereinbefore, with polyurethanes such as those described in Example 1, the aforementioned maximum and minimum amount of nonsolvent may vary by only a few percent; if, instead, certain vinyl chloride polymers are used, the range may be even narrower.

The desired end point for a given system and pore structure is dependent on temperature. A substantially colloidal polymeric dispersion containing somewhat too great an amount of nonsolvent for a given purpose at one temperature may contain somewhat too little nonsolvent at a higher temperature. For this reason, it is normally preferred to determine the desired end point, prepare the substantially colloidal polymeric dispersions at this end point, coat the dispersions and bathe the resulting products at about the same temperature. Dispersions at the desired end point are thus well suited for high-speed production where the easily coatable dispersions can be coated and bathed continuously. Rapid coating and bathing also minimize humidity effects when a hygroscopic solvent is employed. When there is a significant interval between coating and bathing, humidity effects can be minimized by anticipating moisture changes in the coating during the interval and adjusting the endpoint to compensate therefor.

Generally, products formed with substantially colloidal polymeric dispersions containing less than the desired amount of nonsolvent, for example, that amount corresponding to the appearance of the first persistent haze, tend to have substantially finer pores at the surface than in the interior; in extreme cases, they may tend toward products having a thin skin of low permeability. When about such a minimum amount of nonsolvent is used, the resulting dispersions are preferably allowed to age from several hours to several days at about room temperature before they are used. Dispersions to which excess nonsolvent is added, for example, those containing about the aforementioned maximum amount of nonsolvent, tend to have poor structural strength and also tend to have increased proportions of large irregular pores. Such dispersions also can be aged.

If during aging the polymer precipitates out of solution leaving a thixotropic gelatinous mass with little or no clear solution, the resulting product can be readily dispersed provided that the substantially colloidal dispersion described above was originally obtained. Also, the polymer can be heated to aid in redispersion. Substantially colloidal polymeric dispersions containing about the maximum amount of nonsolvent are preferably redispersed, coated and bathed at elevated temperature.

At the end point of addition of nonsolvent, the substantially colloidal polymeric dispersions should in general contain at least about 7% of polymer. The viscosity of the dispersions and the desired void content of the resulting microporous structures, in general, dictate the upper limit, which is usually about 50% by weight of polymer. Optimum results generally are obtained with substantially colloidal dipsersions which contain about from 10 to 25% by weight of polymer. The substantially colloidal polymeric dispersions also should have a viscosity of at least about 1 poise. Dispersions having a viscosity of substantially less than this value tend to be absorbed in porous substrates, are difficult to form into thick films and tend to web in the nonsolvent baths used in the process of this invention. A remarkable feature of the process of this invention is that it can be used with compositions of such low viscosity particularly on porous substrates. The maximum viscosity of the substantially colloidal polymeric dispersions is governed largely by inability to obtain rapid and complete mixing therein during the initial addition of nonsolvent. Normally, dispersions having a viscosity of less than about 800 poises are preferred. Optimum combination of forming, application and product properties is generally obtained with substantially colloidal polymeric dispersions having a viscosity of about from 5 to 100 poises. Viscosity is measured on a Brookfield viscosimeter at a temperature of 20 to 25° C. using a rotor speed of 6 r.p.m. and spindle Nos. 1, 2, 3 and 4 with viscosities in the range of 1 to 10 poises, 10 to 50 poises, 50 to 200 poises and 200 to 1000 poises, respectively.

The method by which the nonsolvent is added is not critical. For example, the nonsolvent can be added slowly to an open vessel containing the polymer solution or it can be added at a measured rate to a vessel equipped with a sparge. However, obviously, localized high concentrations of nonsolvent should be minimized. Thus, to avoid such localized concentrations of nonsolvent vigorous agitation is employed. It is usually desirable to mix the nonsolvent with a portion of the solvent used in the polymeric solution thereby minimizing the danger of overrunning the end point and preventing localized concentrations of nonsolvent.

The substatially colloidal dispersions are next coated onto substrates by conventional coating techniques such as knife, roller or reverse roller coating. For most uses, particularly for leather substitutes, porous fibrous substrates are employed. Such substrates are, for example, woven, twills, drills and ducks; jersey, tricot and simplex knitted materials; felts, needle-punched batts, porous batts impregnated with synthetic resins such as rubber and vinyl halide polymers and even leather. The choice of the particular fibers from which the substrate is made is not critical; they include, for example, those made from polyamides, polyesters, polyesteramides, viscose rayons, wool, cotton, glass and mixtures thereof. Elastomeric fibers and elastic frabrics can also be used. Porous nonwoven, preferably heat-shrunk batts of polyethylene terephthalate fibers impregnated with the aforementioned polymers are particularly preferred substrates for leather substitutes. Obviously, the solvent-nonsolvent system should be chosen so that it does not adversely affect the substrate employed.

Microporous films can be prepared by coating the polymeric dispersions onto impervious substrates of, for example, glass or stainless steel and stripping the resulting microporous coatings therefrom. Also, if desired, the substantially colloidal polymeric dispersions can be interposed between two layers of sheet material, for example, by applying a coating of the dispersions to a sheet of porous, fibrous substrate such as that mentioned above, laying another layer of the substrate thereover, then further processing the layup in accordance with this invention. In such case, the resulting coating acts as an interposed microporous adhesive layer between the two porous substrate layers. Also, such a laminate can be split in the center in which case two substrates with microprous coatings are obtained.

After the dispersions are coated onto the substrates, the coatings are uniformly treated with an inert liquid which is a nonsolvent for the polymeric component and is miscible with the organic solvent. This can, and preferably is done immediately after the substrates are coated. The same type of inert liquids used to form the substantially colloidal dispersions can be used to treat, that is, bathe the polymeric coatings; however, the same specific nonsolvent need not be used in both steps provided that the nonsolvents used in both steps are miscible. For example, water is preferably used both to form the polymeric dispersions and to treat the applied coatings; however, ethylene glycol or glycerol can be used in place of water in either step.

The coated substrates are preferably immersed in the inert liquid; however, they can also be sprayed with the inert liquid. Coated fibrous substrates are preferably floated coated surface down on the nonsolvent initially, then immersed therein. This liquid treatment or bathing completes the formation of the microporous coating and removes all or substantially all of the solvent for the polyeric component. The time and temperature of the liquid treatment is not critical provided that the coating is left in contact with the liquid for a sufficient time to completely form the coating and remove the solvent. In some cases, liquid treatment of from 2 to 3 minutes or less is sufficient. Protracted treatment does not harm the microporous coating.

As mentioned hereinbefore, various process variables can affect $T_0$. At about the lower limit specified hereinbefore, special precautions may be desirable in the choice of other process conditions in order to assure microporous products. In particular, for example, solvents contained in the microporous products after they are removed from the bath and while they are dried tend to reduce $T_0$. Thus, with polymers approaching the lower limit of $T_0$, it is particularly desirable to take particular pains in removing as much as possible of the solvent from the resulting microporous coating during the bathing step. To accomplish this end, the products can be left in the bath for extended periods while the bathing medium is circulated or frequently replaced; nonsolvent bathing medium can be drawn through the product or less viscous non-solvents can be employed. Also, for example, selecting solvents with somewhat less affinity for the polymers in question, for example, less polar solvents, selecting non-solvents with less affinity for the polymer and selecting solvents and nonsolvents with greater mutual affinity, for example, through some mechanism such as hydrate formation as in the case of dimethyl N,N-dimethyl formamide and water, improves removal of solvent. Since the microporous products of this invention are most susceptible to collapse of the pores therein as nonsolvent is removed from the structures, it may also be desirable to lower the temperature of the bath at least just prior to the time at which the microporous products are removed therefrom and dried at such lower temperature.

Finally, the microporous films and coatings are dried, either at room temperature or at elevated temperature, for example, at about 50 to 100° C. As indicated hereinbefore, $T_0$ of polymers decreases as the temperature thereof increases. Thus, with polymers having a $T_0$ approaching the lower limit specified hereinbefore, it is sometimes desirable to lower the temperature of drying to room temperature or even below, if desirable, in combination with vacuum drying.

It is sometimes desirable, particularly when a rapid processing cycle is desired, to subject the microporous films and coatings to steam before they are dried. This steaming drives off substantially all of the residual solvent remaining in the coating and makes it possible to shorten the time of the liquid treatment. The steam treatment cannot be used if the polymer in question saturated with nonsolvent, steam or both and at the temperature of the steamed product has a $T_0$ of less than about 100 pounds per square inch.

Although it is not essential in many applications, surprisingly, the abrasion resistance of the products of this invention formed from polyurethanes or mixtures of vinyl polymer, particularly vinyl chloride polymer, and at least 50% by weight of polyurethane can be very greatly enhanced without degrading other properties, particularly porosity, by giving the products a short heat treatment. In the heat treatment, the finished product is held at about 140 to 200° C. for about 10 to 1 minutes, shorter times being used at the higher temperatures. Preferably, the products are held at about 150 to 170° C. for about 4 to 6 minutes.

Leather substitutes prepared by the process of this invention can be stained, buffed, embossed and top dressed to enhance their hand and appearance by conventional procedures used in the art.

The process of this invention makes it possible to deposit thick films and coatings which have uniform or greatly improved microporosity. Films and coatings, for example, of up to 5 or 10 mils to 50 or 100 mils or more can be prepared by the process of this invention with equal facility. The process of this invention has greatly improved rapidity, efficiency and reproducibility and is applicable to a wide variety of polymers, some of which cannot be formed into microporous products by other known processes. Leather substitutes prepared by depositing the microporous coatings of polyurethane and polyurethane-vinyl polymer blends, and particularly the preferred polyureas described hereinbefore and blends thereof with vinyl chloride polymers on fibrous substrates make excellent replacements for natural leather in upholstery, luggage, hand bags, gloves, boots, shoe uppers and clothing. These products quite unexpectedly have a wearing comfort, durability and tactile properties comparable and, in some properties surpassing those of natural leather.

This application is a continuation-in-part of copending application Serial No. 723,669, filed March 25, 1958, now abandoned.

In the following examples which illustrate the invention, parts and percentages are by weight unless otherwise specified. The first series of examples illustrates the preparation of microporous products from the preferred polyurethanes and mixtures thereof with vinyl polymers.

EXAMPLE 1

Preparation of Polymeric Solution

About 3343 parts of polytetramethyleneether glycol having a molecular weight of about 1000 are mixed with 291 parts of tolylene-2,4-diisocyanate and heated for 3 hours at about 90° C. About 2485 parts of the resulting dimer with hydroxyl end groups are then mixed with 570 parts of methylene bis(4-phenyl isocyanate) and heated for 1 hour at about 80° C. to form a prepolymer with isocyanate end groups. The prepolymer is next dissolved in about 10,000 parts of N,N-dimethyl formamide, then the resulting solution is added slowly to a solution of 50 parts of hydrazine hydrate and 0.5 part of dibutylamine dissolved in about 1,710 parts of N,N-dimethyl formamide. The resulting reaction mixture is finally heated at 80° C. for about 40 minutes to form a solution of polyurea having a viscosity of about 115 poises and containing about 20% solids.

The polyurea solution described above is mixed with a 12% solution in N,N-dimethyl formamide of polyvinyl chloride homopolymer ("Marvinol" VR 10, a proprietary product of the U.S. Rubber Company) to yield a polymeric solution having the following composition:

| | Parts |
|---|---|
| Polyurea | 10.5 |
| Polyvinyl chloride | 5.7 |
| N,N-dimethyl formamide | 83.8 |
| | 100.0 |

Preparation of Microporous Coating

A solution containing 20% water and 80% N,N-dimethyl formamide is added slowly to 60 parts of the polymeric solution just described until the polymeric solution becomes opalescent. At this end point particles of polymer of colloidal size are dispersed in solution. 12.2 parts of water/N,N-dimethyl formamide solution are required to reach this end point. At the end point, the dispersion contains 3.4% water and 13.3% polymer.

A 65-mil wet film of the dispersion is next coated onto a porous, impregnated nonwoven mat of 0.5 denier, heat-shrunk polyethylene terephthalate fibers taped to a glass plate. The nonwoven substrate has previously been impregnated with about 50% based on the weight of fibers of a polyurea similar to that described above.

The coated substrate is next immersed in water at room temperature for about 3 minutes. Finally, the resulting product is removed from the glass plate and immersed in water for an additional 1.5 hours to completely form the polymer coating.

Next, the coated substrate is subjected to steam at 100° C. for 15 minutes, then dried at about the same temperature. The resulting product consisting of a porous fibrous substrate having an adherent uniformly microporous coating about 20 mils thick has a water vapor permeability value (often referred to as LPV or leather permeability value) of about 5000 grams per hour per 100 square meters determined by the test described by Kanagy and Vickers in the Journal of the Leather Chemists Association, 45, 211–242 (April 19, 1950). The microporous coating withstands 500 strokes in an edgewear test before failure. Edge-wear is evaluated by bending a sample of the coated product around a ½-inch mandrel, then rubbing the coated surface of the sample back and forth over cotton duck fabric with strokes of about 4 inches under a load of 4 pounds. In the Schildknecht flex test apparatus described in Bulletin No. 105, published by Alfred Suter, 200 Fifth Avenue, New York, N.Y., a sample of the product withstands about nine-million flexes.

A substantially void-free film of the above polymer blend cast from the N,N-dimethyl formamide solution and soaked in water for several days to saturate it with water has a maximum elastic deformation strength, $T_0$, determined as described hereinbefore of about 180 pounds per square inch. The film, at the temperature of the above microporous coating during drying, still has a $T_0$ of about 100 pounds per square inch.

A sample of the microporous product described above is heat-treated at 165° C. for 5 minutes. After heat-treatment, the product has a LPV of 4900 grams/hour/100 sq. meters, withstands ten-million flexes without failure, and shows no failure after 2000 strokes in the edge-wear test. Thus, heat treatment greatly increases the abrasion resistance of the product of this invention without adversely influencing porosity or other desirable properties.

If the process of this example is repeated using a polyurea formed by substantially the same procedure described above but using dimethyl piperazine instead of hydrazine as the chain-extending agent, substantially similar results are obtained.

The products of this example are useful as leather substitutes in clothing, shoes, boots and the like. The heat-treated product is particularly useful for shoe uppers because of its porosity, flex resistance and particularly because of its high abrasion resistance.

EXAMPLE 2

A polymeric solution in N,N-dimethyl formamide containing 10.7% of the polyurea and 5.9% of the vinyl chloride homopolymer used in Example 1 is prepared. 19.3 parts of a solution containing 80% N,N-dimethyl formamide and 20% water are added slowly to the polymeric solution to form an opalescent polymeric dispersion. The resulting dispersion contains 3.2% water and about 14% polymer. After standing several days, the polymeric dispersion gels somewhat, but is readily redispersed on a conventional mixer.

A 60-mil wet film of the polymeric dispersion described above is knife coated onto a porous, impregnated, nonwoven substrate of 0.5 denier polyethylene terephthalate fibers similar to that described in Example 1 taped to a glass plate. The coated substrate is next immersed in water at room temperature for 30 seconds, then the coated substrate is untaped and left in the water for about 4 hours.

Finally, the coated substrate is steamed for 15 minutes and dried at 100° C. for 30 minutes. The resulting microporous product has properties similar to those of the product of Example 1 prior to heat treatment and is useful for clothing. A void-free film of the polymer blend above has a maximum elastic deformation strength similar to that of the blend in Example 1.

In a like manner, microporous products can be prepared by repeating the procedure of this example, but immersing the coated substrate in a bath of ethylene glycol or glycerol rather than water. Also, microporous films and coatings can be obtained by the general procedure of this example using, for example, N,N-dimethyl acetamide or an equal weight of dimethyl sulfoxide and tetrahydrofuran instead of N,N-dimethyl formamide.

EXAMPLE 3

Twenty-nine parts of a solution containing 80% N,N-dimethyl formamide and 20% water are added slowly to 100 parts of a polymeric solution containing 15% of a polyurea similar to that described in Example 1. The resulting opalescent polymeric dispersion contains 4.5% water, 11.6% polymer and has a viscosity of about 45 poises determined as described hereinbefore. The resulting polymeric dispersion can be knife coated onto fibrous substrates treated with water and dried as described in the preceding examples to yield leather substitutes having microporous coatings consisting entirely of polyurea. Unsupported microporous films can be obtained by coating the polymeric dispersion described above onto "cellophane," treating the coating with water and drying the resulting product as described hereinbefore, then stripping the resulting microporous coating from the "cellophane." A void-free film saturated with water has a $T_0$ at room temperature determined as described hereinbefore of about 100 pounds per square inch.

EXAMPLE 4

To a reaction vessel are charged 2 moles of polytetramethylene ether glycol having a molecular weight of about 1000 and 1 mole of tolylene-2,4-diisocyanate. The resulting reaction mixture is heated for 3 hours at 90° C. Next, 2 moles of methylene bis(4-phenyl isocyanate) are added to the reaction mixture which is heated at 80° C. for 1 hour with agitation. The resulting reaction mixture is then diluted to about 30% solids with N,N-dimethyl formamide. Next, 0.72 part of hydrazine hydrate (65% hydrazine) are dissolved in 21 parts of N,N-dimethyl formamide and charged to a reaction vessel, then the aforementioned polyurethane solution is added slowly thereto until the viscosity of the reaction mixture reaches about 150 poises at which time the addition is stopped. The resulting solution contains about 19.6% solids. A 12.3% solution of high molecular weight homopolymer of vinyl chloride ("Marvinol" VR–10) is blended with the aforementioned polyurethane solution by heating the polyvinyl chloride solution to about 60° C., adding it slowly to the polyurethane solution with rapid agitation, then continuing the agitation for about 30 minutes. The proportions of the polymer solutions together with added solvent are adjusted to give a series of solutions of varying composition. A 80:20 mixture of N,N-dimethyl formamide and water is added slowly with rapid agitation to 200 parts of each of the above mixtures and to each of the original polyurethane and polyvinyl chloride solutions to yield substantially colloidal polymeric dispersions having the following compositions:

| Sample | Ratio of polyurethane to vinyl chloride polymer | Percent water | Percent polymer | Percent transmittance |
|---|---|---|---|---|
| A | 70/30 | 3.26 | 16 | 17 |
| B | 90/10 | 4.38 | 16 | 15 |
| C | 99/1 | 4.0 | 16 | 10 |
| D | 100/0 | 4.13 | 16 | 15 |
| E | 0/100 | 3.05 | 16 | 18 |

Percent transmittance is measured with a Bausch and Lomb spectrophotometer, Spectronic No. 20, using that wave length of light at which there is maximum absorption within the range of the instrument. The above dispersions have viscosities measured at room temperature as described hereinbefore of about from 45 to 280 poises.

A 65-mil wet film of each of the above substantially colloidal polymeric dispersions is quickly cast on a glass plate at a wet-film thickness of about 30 to 40 mils. Next, each film is immersed in water at room temperature and allowed to stand therein for about 16 hours. The products are then removed from the bath and dried in an oven at 110° C. for one hour. Each of the resulting structures has fine, uniform micropores.

A 125-mil wet film of the substantially colloidal polymeric dispersion prepared in sample A above is coated onto a broken twill cotton fabric. As the wet coating is applied a second layer of the aforementioned fabric is laid thereon. The resulting layup is next immersed in water at room temperature for three hours, then dried at 80 to 90° C. The resulting laminate has a peel-bond strength on the order of about 5 pounds per inch and a high LPV. The laminate can be split through the microporous layer to yield two woven cotton substrates with microporous coatings. Substantially similar results are obtained if an impregnated fibrous substrate similar to that in Example 1 and split side leather are laminated by the procedure just described.

EXAMPLE 5

80 parts of polytetramethyleneether glycol having a molecular weight of 988 and 9.68 parts of tolylene-2,4-diisocyanate are heated for 3 hours at 90° C. to yield a prepolymer having a viscosity of about 134 poises at 40° C. and containing about 1.36% of hydroxyl groups. Next, 32.5 parts of the above reaction products are heated with 6.9 parts of methylene bis(4-phenyl isocyanate) for 1 hour at 80 to 90° C., then diluted to 25% solids with N,N-dimethyl formamide. To another reactor are charged 8 parts of N,N-dimethyl formamide and 0.23 part of 1,4-diamino piperazine dissolved in 0.13 part of water. The above 25% solution of polyurethane is added slowly with vigorous agitation to the reactor containing the 1,4-diamino piperazine and held at a temperature of 40 to 45° C. until the resulting solution has a viscosity of about 100 poises. The product is clear, colorless and contains about 18.9% solids.

The above polyurethane solution is combined with a 12% solution of a homopolymer of vinyl chloride to yield a polymer solution containing about 15.7% solids. An 80:20 weight mixture of N,N-dimethyl formamide and water is added slowly to the above solution until about the point at which a substantially colloidal polymeric dispersion is obtained. At this point the resulting composition contains about 13% polymer and 3% water and has a viscosity of greater than about 1 poise.

The above substantially colloidal polymeric dispersion is coated onto a porous fibrous substrate similar to that in the preceding example, floated, coated-surface down, in a water bath at room temperature, then immersed in the bath for about 16 hours and, finally, dried at 100° C. The resulting product has a LPV of 1150 grams/hour/100 sq. meters, an edge-wear resistance of greater than 2000 strokes and a flex durability of greater than 10,000,000. This product also has particularly outstanding resistance to yellowing and other degradation by ultraviolet light.

EXAMPLE 6

95.7 parts of polyisopropyleneether glycol having a molecular weight of 1000 together with 50 parts of methylene bis (4-phenyl isocyanate), 0.2 part of pyridine and 0.05 part of phosphoric acid are charged to a reaction vessel and heated for 85 minutes at 90° C. Next, the reaction mixture is diluted with 375 parts of N,N-dimethyl formamide to form a prepolymer solution. About 4 parts of hydrazine hydrate (65% hydrazine) dissolved in 225 parts of N,N-dimethyl formamide are charged to another reaction vessel, then 400 parts of the aforementioned prepolymer solution are added to the hydrazine hydrate solution over a period of about 8 minutes. The temperature during the reaction is about 43° C. The resulting polyurethane solution has a viscosity of about 280 poises and contains about 19% solids.

The above polyurethane solution is blended with 12% solutions of various vinyl chloride polymers to yield solutions having the following compositions:

| Sample | Added polymer | Ratio of polyurethane to added polymer | Percent polymeric component |
|---|---|---|---|
| A | Copolymer 85% vinyl chloride and 15% vinyl acetate ("Vinylite" VYHH) | 4/1 | 16.3 |
| B | Copolymer 85% vinyl chloride, 15% vinyl acetate, 3% vinyl alcohol ("Vinylite" VAGH) | 4/1 | 17.1 |
| C | Homopolymer of vinyl chloride ("Marvinol" VR-10) | 4/1 | 16.3 |
| D | Copolymer of vinyl chloride and vinylidene chloride ("Geon" 202) | 4/1 | 17.0 |

An equal weight mixture of N,N-dimethyl formamide and water is added slowly with rapid agitation to 200 parts of each of the above solutions until about the point a hazy, opalescent, substantially colloidal, polymeric dispersion is obtained. The above dispersions have the following compositions:

| Sample | Percent H₂O | Percent polymer |
|---|---|---|
| A | 4.5 | 13.9 |
| B | 8.3 | 12.5 |
| C | 4.0 | 12.0 |
| D | 3.1 | 14.0 |

Each of the above substantially colloidal polymeric dispersion is coated onto a nonwoven fibrous impregnated substrate substantially similar to that described in Example 1 at about a 60-mil wet film thickness, placed, coating-side down, on the surface of a bath of methanol, then immersed therein. The samples are left overnight in the bath, then dried in an oven at 100° C. All of the resulting products have a fine uniformly microporous cell structure. Each of the polymeric components of the microporous coatings has a $T_0$ of above 100 pounds per square inch during drying.

EXAMPLE 7

A polyurethane is prepared, inter alia, from polyisopropyleneether glycol by a procedure similar to that described in the preceding example. The resulting polymer solution in N,N-dimethyl formamide and containing about 19.6% solids is blended with two 20% solutions in N,N-dimethyl formamide of acrylic polymer. The first acrylic polymer is a homopolymer of ethyl methacrylate, the second is a copolymer of about 50% of n-butyl methacrylate and 50% of isobutyl methacrylate. The ratio of polyurethane to vinyl polymer in the resulting mixtures is 60:40.

An 80:20 mixture of N,N-dimethyl formamide and water is added slowly with agitation to the resulting solutions until hazy, opalescent dispersions are obtained containing 6 to 8% of water and 12 to 14% of polymer. The resulting dispersions are then coated at a 60-mil wet film thickness onto a substrate similar to that described in Example 1. The coated substrates are flated coated-side down in a water bath at room temperature, then immersed therein. After about 16 hours in the bath the products are removed and dried at 100° C. The product containing the polymer of ethyl methacrylate (sample A) has a LPV of 8000 grams/hour/100 sq. meters, while the product containing the copolymer of n-butyl methacrylate and isobutyl methacrylate (sample B) has a LPV of 4000. Both samples have an edge-wear resistance of about 100 strokes. Sample A is heat treated for 5 minutes at 160° C. after which it has an edgewear resistance of 2000 strokes and a LPV of 4000.

EXAMPLE 8

274 parts (0.93 mole) of the sodium salt of the monosulfonic acid substituted dimethyl isophthalate are reacted with 3952 parts (4 moles) of polytetramethyleneether glycol having a molecular weight of about 988 for 10 hours at 150 to 200° C. and at a pressure of 5 millimeters of mercury absolute. 1585 parts of the resulting reaction mixture are blended with 250 parts (0.4 mole) of methylene bis(4-phenyl isocyanate) and heated at 90° C. for 1 hour. The resulting reaction mixture is then diluted with 1590 parts of N,N-dimethyl formamide and reacted with 8 parts of hydrazine hydrate (65% hydrazine). A 20% solution in N,N-dimethyl formamide of the resulting polymer has a viscosity of about 125 poises.

The above polyesterurethane solution is blended with a 12% solution of a homopolymer of vinyl chloride ("Marvinol" VR-10) in N,N-dimethyl formamide to give a 16% solution containing a ratio of polyurethane to polyvinyl chloride of about 65:35.

An 80:20 weight mixture of N,N-dimethyl formamide and water is added slowly with rapid agitation to the above polymeric solution at room temperature until about the point at which a substantially colloidal dispersion is obtained. At this end point the resulting dispersion contains about 13.2% solids and about 3.5% water.

The above substantially colloidal polymeric dispersion is next coated onto a nonwoven substrate substantially similar to that described in Example 1, floated in a water both coated-surface down, immersed in the water bath at room temperature for about 16 hours, removed from the bath and dried for 1 hour at 100° C. The resulting product has an LPV of about 5000 grams/hour/100 sq. meters, an edge-wear resistance of about 2000 strokes and a flex durability of greater than 10,000,000 flexes.

EXAMPLE 9

A polyester is prepared by heating together 344 parts (2.0 moles) of 1,10-decamethylene glycol, 124 parts (2.0 moles) of ethylene glycol and 415 parts (2.5 moles) of isophthalic acid in the presence of 0.2 part of p-toluene sulfonic acid catalyst and 150 parts of toluene. During the reaction, toluene and water are continually removed from the reaction mixture until, after about 7 hours, the temperature has risen to 200° C. Next, the reactor pressure is reduced and the reaction continued at 200 to 240° C. at 15 to 20 millimeters of mercury absolute for about 5 hours. The resulting product contains ethylene glycol, decamethylene glycol and isophthalic acid in a mole ratio of about 10:40:50 and about 0.85% of hydroxyl groups.

Next, 247 parts (about 0.06 mole) of the polyester above together with 29 parts (0.12 mole) of methylene bis(4-phenyl isocyanate) are heated for 1 hour at 90° C. The reaction product is diluted with 1100 parts of N,N-dimethyl formamide and further reacted with 3.5 parts of hydrazine. The resulting polyurethane has a viscosity of about 50 poises at 20% solids.

An equal-weight mixture of N,N-dimethyl formamide in water is added slowly with rapid agitation to a 16% solution in N,N-dimethyl formamide of a blend of the above polyester urethane and a homopolymer of vinyl chloride ("Marvinol" VR-10) in a weight ratio of about 65:35. At the end point, the substantially colloidal polymeric dispersion contains about 13% polymer and 3.7% water. The resulting substantially colloidal polymeric dispersion is cast onto a nonwoven substrate similar to that described in Example 1, floated coated side down, on a water bath, then immersed in the water for about 16 hours, removed from the water and dried for about 1 hour at 100° C. The resulting 10-mil porous coating has a LPV of about 5600 grams/hour/100 sq. meters, an edgewear resistance of greater than 2000 strokes, and a flex durability of one-half million flexes.

The above general procedure is repeated except that the polyvinyl chloride is omitted from the polymeric component. The resulting product has a LPV of about 10,900, but, otherwise, has substantially similar properties.

EXAMPLE 10

292 parts (2 moles) of adipic acid are reacted with 260 parts (2.5 moles) of pentanediol-1,5 in the presence of toluene, a carrier for the water by-product, at a temperature of about from 135 to 200° C. for 8 hours. At the end of this period, the reaction pressure is reduced to 2 to 5 millimeters of mercury absolute and the reaction continued at 200 to 220° C. for one hour, after which time the remaining toluene is stripped from the reaction mixture. The resulting polyester has about 2.6% of hydroxyl groups, a melting point of 32° C. and a molecular weight on the order of 1300.

260 parts (0.2 mole) of the above polyester and 17.4 parts (0.1 mole) of tolylene-2,4-diisocyanate are heated for 3 hours at 90° C., then 52.5 parts (0.21 mole) of methylene bis(4-phenyl isocyanate) are reacted therewith for an additional one hour at 90° C. The resulting product is diluted with 1320 parts of N,N-dimethyl formamide, then further reacted with 6.5 parts of hydrazine hydrate (65% hydrazine). A 20% solution in N,N-dimethylformamide of the resulting polyurethane has a viscosity of about 15 poises.

The polyesterurethane solution above is blended with a 12% solution of a homopolymer of vinyl chloride ("Marvinol" VR-10) to yield a 16% solution containing polyurethane and vinyl chloride polymer in a weight ratio of 65:35. An 80:20 weight mixture of N,N-dimethyl formamide and water is added slowly with rapid agitation to the polymer solution blend above until about the point at which a substantially colloidal polymeric dispersion is formed. At this point the resulting dispersion contains 13.2% polymer and contains 3.5% water.

The above dispersion is cast onto a nonwoven substrate similar to that described in Example 1. The coated substrate is floated, coated-side down, on a water bath, then immersed therein for about 16 hours at room temperature. Finally, the product is withdrawn from the water bath and dried for 1 hour at 100° C. The resulting product has a LPV of about 8000 grams/hour/100 sq. meters, an edge-wear abrasion resistance of 2000 strokes and a flex durability of about one-half million flexes.

EXAMPLE 11

A mixture of 1500 parts of hydroxyl-terminated polytetramethylene adipate having a molecular weight of about 850, a hydroxyl number of about 130 and an acid number of about 0.9 together with about 114 parts of tetramethylene glycol is melted and agitated for 20 minutes under a pressure of about 5 to 6 millimeters of mercury absolute at 100 to 110° C. The resulting reaction mixture is then added to about 758 parts of methylene bis(4-phenyl isocyanate) and the reaction continued at about 140° C. for about 3.5 hours. The resulting product is dissolved in N,N-dimethyl formamide, blended with a solution in N,N-dimethyl formamide of a partially hydrolyzed copolymer of about 35% of vinyl chloride and 15% of vinyl acetate ("Vinylite" VAGH) to yield a solution containing about 16% solids and having a weight ratio of polyurethane to vinyl chloride polymer of about 4:1. An equal-weight mixture of N,N-dimethyl formamide in water is added slowly to the above dispersion until about the point at which a substantially colloidal dispersion is obtained. The resulting dispersion contains about 14.5% polymer and 4.5% water. The dispersion is coated onto a fibrous substrate similar to that described in Example 1, floated, coated-surface down, on a water bath at room temperature for a few minutes, then immersed in the water bath overnight. The product is withdrawn from the water and dried at about 100° C. to yield products similar to those described in Examples 8 to 10.

The following examples illustrate the use of various different solvents and nonsolvents, with polyurethanes and other polymers, in the process of this invention.

EXAMPLE 12

A hydroxyl-terminated polyester having a molecular weight of about 1000 is prepared from 2-ethyl-2-methyl propanediol-1,3 and adipic acid by a procedure substantially similar to the polyester preparation in Example 10. One mole of polyester is then reacted with 2 moles of methylene bis(4-phenyl isocyanate) and chain extended with hydrazine as described in Example 10 except that N,N-dimethyl acetamide is used instead of N,N-dimethyl formamide. The resulting polyurethane solution is blended with a solution of a homopolymer of vinyl chloride ("Marvinol" VR-10) in N,N-dimethyl acetamide to give a 16% solution containing polyurethane and polyvinyl chloride in a weight ratio of 65:35.

An 80:20 mixture of N,N-dimethyl acetamide and water is slowly added to the above solution until a substantially colloidal polymeric dispersion is obtained having a concentration of polymer and water of about 12.8% and 4%, respectively. The resulting substantially colloidal polymeric dispersion is coated onto a substrate similar to that described in Example 1, floated coated-surface down, in a water bath at about room temperature then immersed in the water for about 16 hours. Finally, the product is dried at room temperature. The resulting product has a LPV of 10,000 grams/hour/100 sq. meters, an edgewear abrasion resistance of 1000 strokes and a flex durability of greater than 1,000,000.

EXAMPLE 13

A polyurethane is prepared from polytetramethyleneether glycol of 1000 molecular weight, tolylene-2,4-diisocyanate, methylene bis(4-phenyl isocyanate) and hydrazine as described in Example 4 except that N,N-dimethyl acetamide is substituted for the N,N-dimethyl formamide used in that example. The resulting polymeric solution contains 18.3% solids and has an intrinsic viscosity in N,N-dimethyl acetamide of 1.05. The above polymeric solution is blended with a 13% solution of a homopolymer of vinyl chloride to yield a 16% solution having a ratio of polyurethane to polyvinyl chloride of 65:35. Fifty-one parts of a 80:20 mixture of N,N-dimethyl acetamide and water are added slowly to 200 parts of the above polymeric solution until about the point at which an opalescent substantially colloidal polymeric dispersion is formed containing about 4.1% water and 12.7% polymer. The resulting dispersion is coated onto a substrate similar to that described in Example 1, floated in a water bath at room temperature coated-side down, then immersed in the bath for 16 hours. Next, the coated substrate is withdrawn from the water and dried at room temperature. The resulting microporous product has a LPV of 3500 grams/hour/100 sq. meters and an edgewear resistance of 500. The product is heat treated for 3 minutes at 160° C. after which time it has a LPV of 3500 grams/hours/100 sq. meters, an edgewear resistance of 2000 strokes and a flex resistance of greater than 10,000,000 flexes. A void-free film of the polymer blend above saturated with water and at about room temperature has a $T_0$ of about 180 pounds per square inch determined as described hereinbefore.

EXAMPLE 14

About 12 parts of glycol monoethylether are added to a solution containing about 50 parts of N,N-dimethyl formamide, 6.4 parts of a polyurea and 3.4 parts of a vinyl chloride homopolymer similar to those used in Example 1. This quantity of glycol monoethylether, which is a nonsolvent for the polymeric component and miscible with the N,N-dimethyl formamide, is insufficient to form a colloidal dispersion. Next, about 14 parts of a solution containing 80% N,N-dimethyl formamide and 20% water are added slowly to the aforementioned polymeric solution thereby forming a substantially colloidal polymeric dispersion containing about 14.8% nonsolvent and 11.4% polymer. A 65-mil wet film of dispersion is knife coated onto a non-woven substrate similar to that used in the preceding example. Finally, the coated substrate is immersed in water for about 16 hours, then dried. The resulting product is substantially uniformly microporous. A void-free film of the polymer blend saturated with water has a $T_0$ of about 180 pounds per square inch.

EXAMPLE 15

Inert nonsolvents are each added slowly as follows to fifty parts of a polymeric solution in N,N-dimethyl formamide containing 13% of a polyurea and 7% of a vinyl chloride homopolymer similar to those shown in Example 1 to form opalescent, substantially colloidal, polymeric dispersions.

| Nonsolvent | Parts of nonsolvent added | Percent nonsolvent in dispersion | Percent polymer |
|---|---|---|---|
| Methyl alcohol | 15.1 | 23.2 | 15.3 |
| Glycerol | 5.2 | 9.4 | 18.1 |
| Ethylene glycol | 7.6 | 13.1 | 17.4 |

Each of the three dispersions described above are aged for 24 hours. After any polymer which had settled is redispersed, a 50-mil wet film of each dispersion is coated onto a fibrous substrate similar to those described in the previous examples. Finally, the coated substrates are immersed in water at about room temperature for 2 hours. Each of the products has a substantially uniform microporous coating and is useful as a leather substitute.

EXAMPLE 16

A 15% solution in dioxane is formed of a homopolymer of methyl methacrylate having a molecular weight of about 500,000. An equal-weight mixture of dioxane and water is added slowly with agitation to 100 parts of the polymer solution at room temperature until a substantially colloidal polymeric dispersion containing about 12.8% water and 11.1% polymer and having a viscosity of about 18.5 poises is formed. The resulting dispersion is cast onto a glass plate at a wet-film thickness of about 65 mils, then immersed in water at 20° C. for about 2 hours. Finally, the product, washed substantially free of dioxane, is removed from the water and dried at room temperature to yield a microporous film of this invention.

A void-free film of the above polymer saturated with water has a $T_0$ at room temperature of greater than 2500 pounds per square inch.

EXAMPLE 17

A homopolymer of methyl methacrylate having a molecular weight of about 500,000 is dissolved in various proportions of toluene solvent. Next, hexane is slowly added to the above solutions with rapid agitation until about the point at which substantially colloidal polymeric dispersions having the following properties are obtained:

| Sample | Percent polymer | Percent hexane | Viscosity, poises |
|---|---|---|---|
| A | 17.7 | 11.8 | 380 |
| B | 13.1 | 12.4 | 4.1 |
| C | 8.6 | 13.4 | 2.0 |

Each of the above dispersions is next coated onto a glass plate, immersed in hexane for about 20 to 30 minutes, then bathed in 3 more hexane baths for about from 20 to 30 minutes each to yield a microporous film of this invention. A void-free film of the above polymer of methyl methacrylate saturated with hexane at room temperature has a maximum elastic deformation strength at room temperature of greater than 500 pounds per square inch.

The following examples illustrate additional polymeric components useful in the process of this invention.

EXAMPLE 18

A solution having the following composition is prepared:

| | Parts |
|---|---|
| Vinyl chloride homopolymer | 14.0 |
| Di(2-ethyl hexyl)phthalate | 8.3 |
| N,N-dimethyl formamide | 77.7 |
| | 100.0 |

To 100 parts of the solution described above are added slowly 26.9 parts of a solution containing 90% N,N-dimethyl formamide and 10% water. The resulting opalescent dispersion contains about 2.1% of water and 17.6% polymer (including plasticizer).

A porous impregnated fibrous substrate similar to that used in the preceding examples is coated with a 78-mil wet film of the dispersion described above, immersed in water and dried as previously described. The resulting product coated with a uniformly microporous vinyl polymer coating has a LPV of about 3400 grams/hour/100 sq. meters and withstands about one-million flexes in the Schildknecht flex test. The product of this example can be used as a leather replacement, but is less durable than the products of the preceding examples containing polyurethanes.

EXAMPLE 19

A 10% solution in N,N-dimethyl formamide of a homopolymer of vinyl chloride ("Geon" 121) is blended with various amounts of di(2-ethyl hexyl)phthalate plasticizer. A mixture of 80% of N,N-dimethyl formamide and 20% water is added to each of the resulting solutions until about the point at which opalescent substantially colloidal polymeric dispersions are formed. The dispersions have the following properties:

| Samples | Ratio of polymer to plasticizer | Percent polymer (including plasticizer) | Percent water | Viscosity, poises | Percent transmittance (determined as described herinbefore) |
|---|---|---|---|---|---|
| A | 100/0 | 8.7 | 2.6 | 20 | 90 |
| B | 75/25 | 11 | 3.5 | 23 | 73 |
| C | 65/35 | 12.7 | 3.5 | 18 | 65 |

The above dispersions are cast onto glass plates and immersed in water at 25° C. for 16 hours. The resulting microporous structures are then removed from the water and dried at room temperature. The microporous films of samples A to C have LPV's of >20,000, 9290 and 6340 grams/hour/100 sq. meters, respectively. Void-free films formed from the initial solutions of samples A to C and saturated with water have maximum elastic deformation strengths determined as described hereinbefore of 5955, 1585, 157 pounds per square inch, respectively.

EXAMPLE 20

Twenty parts of polyalphamethylstyrene ("Cymac" 400, a proprietary product of the American Cyanamid Co.) is dissolved in 80 parts of N,N-dimethyl formamide. A solution containing 95% of N,N-dimethyl formamide and 5% of water is added to the resulting polymeric solution until a hazy, opalescent dispersion is formed. A 65-mil wet film of the resulting dispersion is coated onto nylon glove fabric and the resulting coated substrate is immersed in water for one hour. Finally, the product is dried at room temperature. The resulting product consists of a woven fabric substrate firmly adhered to a uniformly microporous coating of polyalphamethylstyrene. The product of the example can be used as an ink pad.

EXAMPLE 21

A solution is prepared by dissolving 12.4 parts of methyl methacrylate polymer in 87.6 parts of N,N-dimethyl formamide. The methyl methacrylate polymer consists of a copolymer of about 98% of methyl methacrylate and 2% of methacrylic acid and has a relative viscosity of about 1.15 determined by A.S.T.M. D-445-46T, Method D. Sixty parts of the resulting solution are titrated with 6.8 parts of a solution of 40% water and 60% N,N-dimethyl formamide to form a hazy, opalescent dispersion containing about 4.1% water and 11.1% polymer. Finally, a 65-mil wet film of the dispersion is coated onto nylon glove fabric and the coated substrate is immersed in water for 2 hours, then dried overnight at room temperature. The resulting coating is uniformly microporous and rather stiff.

EXAMPLE 22

Thirty-one parts of a 60:40 N,N-dimethyl formamide/water solution is added slowly to 71 parts of a 20% solution in N,N-dimethyl formamide of ½-second cellulose acetate butyrate. At about this point a substantially colloidal polymeric dispersion is formed containing about 7% polymer and 13% water. The resulting substantially colloidal polymeric dispersion is knife coated onto woven nylon fabric, then the coated fabric is immersed in water at room temperature for about 16 hours. Finally, the product is dried at room temperature to yield a coated woven fabric having a uniformly microporous coating.

EXAMPLE 23

12.5 parts of a 80:20 mixture of N,N-dimethyl formamide and water is added slowly to a 11.2% solution of a polyester of ethylene glycol and an acid component comprising 55% of terephthalic acid and 45% of sebacic acid. The polymer has a melting point on the order of 140° C. At about this point, a substantially colloidal polymeric dispersion is formed containing about 10% solids and about 2.3% water. The resulting dispersion is cast onto a knitted nylon fabric at a 65-mil wet film thickness, immersed in water for 4 hours at room temperature, then dried at the same temperature.

EXAMPLE 24

A 15% solution in N,N-dimethyl formamide is formed of a high molecular weight condensation product of m-phenylene diamine and an acid chloride component comprising 70% by weight of terephthaloyl chloride and 30% by weight of isophthaloyl chloride. About 26 parts of a 60:40 mixture of N,N-dimethyl formamide and water are then added to the solution. At this point, a substantially colloidal polymeric dispersion is formed having a concentration of about 8.3% water and 12% polymer. The resulting substantially colloidal polymeric dispersion is coated onto a glass plate at a wet-film thickness of 65 mils and immersed in water for 3 hours. Finally, the product is dried at 110° C. to yield a uniformly microporous structure.

The following examples illustrate various miscellaneous embodiments of this invention.

EXAMPLE 25

A 15% solution in N,N-dimethyl formamide of a homopolymer of methyl methacrylate having a molecular weight of about 500,000 is titrated with an 80:20 mixture of N,N-dimethyl formamide and water until about the point at which a substantially colloidal polymeric dispersion is formed containing 7.8% water, 10.8% polymer and having a viscosity at 20° C. determined as previously described of 800 poises. A 35-mil wet film of the resulting dispersion is cast onto a glass plate and immersed in water at 20° C., washed in the water for 2 hours, then removed from the bath and dried at room temperature. A cross-section of the resulting product shows uniform microporosity. The $T_0$ of a void-free film of the above polymer at room temperature and saturated with water is greater than 2500 pounds per square inch. This example illustrates high viscosity substantially colloidal polymeric dispersions.

EXAMPLE 26

A polyurea similar to that described in Example 4 is prepared by the general procedure described in that example. The resulting polyurethane solution containing about 20% polymer is next blended with a 12% solution of polyvinyl chloride ("Marvinol" VR-10) in N,N-dimethyl formamide to yield a polymer blend containing about 16% polymer composed of polyurethane and polyvinyl chloride in a 65:35 ratio.

Next, about 1.5 parts of hydrazine hydrate are added slowly with vigorous agitation to 100 parts of the above polymeric solution. The reaction is continued for about 4 minutes after which time 18 parts of a 80:20 mixture of N,N-dimethyl formamide and water is added slowly to the polymer solution until about the point at which a substantially colloidal polymeric dispersion is obtained having a polymer concentration of about 18.5% and about 3% water. The resulting dispersion is then deaerated, filtered and cast onto a non-woven substrate similar to that described in Example 1 at a wet-film thickness of about 65 mils. Next, the coated substrate is floated, coated-side down, on water at about room temperature for about 30 seconds and then immersed in the water for 1 hour. Finally, the resulting product is dried at about 100° C. The product has a vapor permeable coating about 12 mils thick having a LPV of about 8000 grams/hour/100 sq. meters.

The substantially colloidal polymeric dispersion above is knife coated onto split side leather, then the resulting product is bathed in water at about room temperature and dried at the same temperature. The resulting microporous coated product has a LPV on the order of 5000–10,000 grams/hour/100 sq. meters, a flex durability of approximately 10-million flexes and an edgewear resistance of about 2000 strokes.

EXAMPLE 27

The following composition is blended on a 2-roll rubber mill:

| | |
|---|---|
| Copolymer of 69% butadiene, 26.5% acrylonitrile, 4.5% methacrylic acid | 100 |
| Zinc oxide | 5.0 |
| Sulfur | 0.05 |
| Tetramethyl thiuram disulfide—accelerator | 1.5 |
| 2,2-methylene bis(4-phenyl-6-tertiarybutyl phenol) —antioxidant | 2.0 |

A 25% solution of the above composition in N,N-dimethyl formamide is blended with 10% solution of polyvinyl chloride in N,N-dimethyl formamide to yield a solution containing about 16% of polymer and having a ratio of the above terpolymer to polyvinyl chloride of about 65:35. Next, 21 parts of a solution of an 80:20 mixture of N,N-dimethyl formamide and water is added slowly to 100 parts of the above solution to yield a substantially colloidal polymeric dispersion containing about 13% polymer and 2.5% water. The resulting polymeric dispersion is coated onto a non-woven fibrous substrate similar to that described in Example 1 at a wet-film thickness of about 65 mils. Next, the coated substrate is floated, coated-side down, in a water bath at 16° C. for about 30 seconds, then completely immersed in water at about 16° C. for about 30 minutes. A void-free film of the polymer in the coating on the product in the bath at this point saturated with water has a $T_0$ of less than about 100 pounds per square inch. Next, the bathed product is transferred to another water bath without drying and heated at 80 to 90° C. for 20 minutes to cure the polymer and raise $T_0$, then again bathed in water at 16° C. for 1 hour. Next, the resulting product is removed from the bath and dried at about 100° C. Finally, the product having a microporous coating is completely cured at 150° C. for 30 minutes.

The following are other polymer, solvent and nonsolvent systems, in addition to those shown in the preceding examples, which can be used in the process of this invention:

| Polymer | Nonsolvent | Solvent | Maximum [1] |
|---|---|---|---|
| Polyethylene-terephthalate ("Mylar"). | Water | Phenol | 6,900 |
| | Ethanol | Phenol, o-chlorophenol, m-cresol. | 7,100 |
| | Acetone | do | 5,200 |
| | Hexane | do | 7,400 |
| | Toluene | do | 6,200 |
| | Tetrachloroethylene. | do | 800 |
| Polyamide of 25% caprolactam, 50% hexamethylene diamine adipamide and 25% of hexamethylene diamine sebacamide. | Water | Ethanol, 90% aqueous formic acid. | 370 |
| Ammoniated copolymer of tertiarybutyl acrylate and glycidyl methacrylate (97/3). | do | Dioxane, N,N-dimethyl formamide, tetrahydrofuran, diethylene glycol dimethyl ether. | 1,500 |
| Homopolymer of methylmethacrylate (500,000 m.w.). | do | Acetone, tetrahydrofuran. | >2,500 |
| Polyamide of hexamethylene adipamide, 45% of amide groups bearing N-methoxy-methyl substituents. | Water | Ethanol | 290 |
| Blend of polyurethane/ polyvinyl chloride of Example 1. | do | Hexamethyl phosphoramide. | 180 |
| Copolymer 90% vinyl chloride and 10% ethyl acrylate. | do | N,N-dimethyl formamide, dioxane, diethylene glycol dimethylether. | 130> |
| | Hexane, petroleum naphtha. | Methyl isobutyl ketone, chloroform. | |
| Polyacrylonitrile | Water | N,N-dimethyl formamide, dimethyl sulfone. | >130 |
| | Methanol | Sulfolane | |
| | Ethanol | Sulfolane, malonitrile. | |
| | Benzene | m- and p-Nitrobenzene. | |
| Polyvinylidene chloride. | Water | N,N,dimethyl formamide, dioxane, tetrahydrofuran. | >100 |
| | Chloroform | Tetrahydrofuran | |
| | Hexane | Dioxane | |

[1] Maximum elastic deformation strength, in p.s.i. at room temperature in the presence of nonsolvent.

I claim:
1. An improved process for porducing microporous films and coatings which comprises
    (1) forming a polymeric solution having as essential constituents a polymeric component and solvent for said polymeric component, said polymeric component having a maximum elastic deformation strength, under the drying conditions of step (5) below, of at least 100;
    (2) adding to said polymeric solution, at a temperature at which a colloidal dispersion will form, an inert liquid, which is a non-solvent for said polymer but which is miscible with said solvent, until about the point at which a substantially colloidal polymeric dispersion is formed, said substantially colloidal dispersion having a viscosity greater than about 1 poise and a polymer concentration of greater than about 7% by weight;
    (3) coating said dispersion onto a substrate;
    (4) directly bathing the resultant coating, at about the temperature at which the colloidal dispersion was formed, with a liquid which is a non-solvent for said polymeric component and miscible with said solvent to remove the solvent; and
    (5) drying the resulting product.
2. The process of claim 1 wherein said dried product is heated at about 140° C. to 200° C. for about 10 to 1 minutes.
3. The process of claim 1 wherein the polymeric component comprises a polyurethane.
4. The process of claim 3 wherein the polymeric component comprises a vinyl chloride polymer-polyurethane mixture containing at least 50% polyurethane by weight.
5. The process of claim 3 wherein the maximum elastic deformation strength of the polymeric component is about from 130 to 300 pounds per square inch.
6. The process of claim 3 wherein said solvent is N,N-dimethyl formamide.
7. The process of claim 4 wherein an amino compound containing at least one active hydrogen atom attached to an amino nitrogen atom is added to the polymer solution and reacted with said polymeric component prior to addition of said non-solvent.
8. The process of claim 4 wherein the polymeric component is a blend of a vinyl chloride polymer and a polyurea formed by chain extending with hydrazine the reaction product of an arylene diisocyanate and an alcoholic component selected from the class consisting of polytetramethyleneether glycol and polypropyleneether glycol, of about 400 to 2000 molecular weight, said polymeric component comprising at least 50% by weight of said polyurea; and said substantially colloidal polymeric dispersion contains about 10–25% by weight of said polymeric component and about 5–2% by weight of water.

9. The process of claim 8 wherein the arylene diisocyanate is a mixture of tolylene-2,4-diisocyanate and methylene bis(4-phenyl isocyanate).

References Cited in the file of this patent
UNITED STATES PATENTS

| | | |
|---|---|---|
| 2,776,947 | Schildknecht | Jan. 8, 1957 |
| 2,780,562 | Reinartz et al. | Feb. 5, 1957 |
| 2,848,752 | Bechtold | Aug. 26, 1958 |
| 2,929,800 | Hill | Mar. 22, 1960 |
| 2,957,852 | Frankenberg et al. | Oct. 25, 1960 |
| 3,000,757 | Johnston et al. | Sept. 19, 1961 |